United States Patent [19]

Wehlau

[11] 3,846,918

[45] Nov. 12, 1974

[54] GOLF AID
[76] Inventor: Paul A. Wehlau, 397 Cascade Dr., Fairfax, Calif. 94930
[22] Filed: Nov. 16, 1973
[21] Appl. No.: 416,611

[52] U.S. Cl................. 33/262, 33/277, 63/1 R, 63/15
[51] Int. Cl........................... G01c 3/24, A44c 9/00
[58] Field of Search ............ 33/262, 277, 276, 289; 63/1 R, 15

[56] References Cited
UNITED STATES PATENTS

| 1,536,365 | 5/1925 | Wiseman............................. 63/1 R |
| 2,519,727 | 8/1950 | Yesdan................................. 33/277 |
| 2,530,291 | 11/1950 | Conway et al........................ 63/1 R |
| 2,970,379 | 2/1961 | Hardgrove........................... 63/1 R |
| 3,409,987 | 11/1968 | New..................................... 33/277 |

Primary Examiner—Louis R. Prince
Assistant Examiner—Steven L. Stephan
Attorney, Agent, or Firm—Robert R. Tipton

[57] ABSTRACT

A distance measuring device uses a finger ring incorporating a plurality of facets having edges of different dimensions which ring is held at arms length from the golfer's eye while being worn on the golfer's finger, and the edges of the facets compared with the height of the flag staff mounted in the hole of a golf course green with each facet edge calibrated in accordance with the club size to be used when the staff height matches a particular facet edge.

7 Claims, 6 Drawing Figures

PATENTED NOV 12 1974　3,846,918

GOLF AID

BACKGROUND OF THE INVENTION

This invention relates generally to distance measuring devices and in particular to hand held devices using a distant object of known dimension.

Generally, devices that use a distant object of known dimension to estimate distant are well known in the art, however, they are generally complicated in design using mechanically adjusted scales and, in some instances, optical aids such as lenses and mirrors. In all cases, if the computation is not performed by a mechanical apparatus associated with the sighting device, it must be performed by the operator.

Typically, distance measuring apparatus of the prior art uses a scaling device held at a fixed distance from the eye of the operator by a strap or rigid bar or arm. The scaling device usually comprises a rigid or fixed scale or ruler on which is mounted a slidable pointer or scale. The sliding pointer is moved relative to a fixed point on the fixed scale to match the known dimension of the distant object while the apparatus is held at the fixed distance from the operators eye, usually by a strap around the operators neck. By multiplying the reading on the scale with the known dimension of the distant object, the operator can determine its distance away.

All such devices are generally cumbersome and cannot be conveniently carried by a golfer during play.

SUMMARY OF THE INVENTION

The distance measuring device of the present invention requires no cumbersome mechanism of moving parts nor does it require further computations by the observer, but rather, the device of the present invention is a finger ring having a plurality of facets with edges of different lengths, each facet edge being calibrated for comparision with a distant object of known dimension, and the comparison of the length of the facet edge with the known dimension being made when the ring is held at arms length from the observer's eye.

It is, therefore, an object of the present invention to provide a distance measuring device.

It is another object of the present invention to provide a distance measuring device that can be worn on the finger of an observer.

It is a further object of the present invention to provide a distance measuring device for use by a golfer.

It is still another object of the present invention to provide a distance measuring device calibrated in terms of golf club size to be used for the distance measured.

These and other objects of the present invention will be manifest upon study of the following detailed description when taken together with the drawing.

DESCRIPTION OF THE PREFERRED EMBODIMENT

Figure 1:
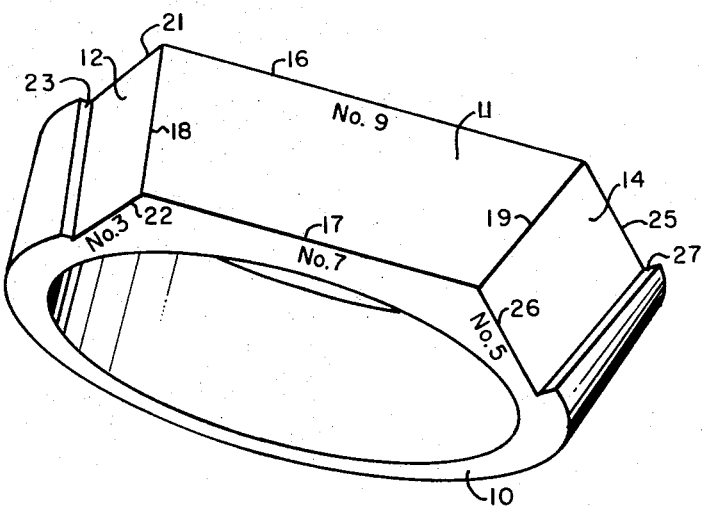
FIG. 1 is an isometric view of the distance measuring ring of the present invention.

With reference to FIG. 1, the distance measuring ring of the present invention comprises, basically, a ring body 10 having a top facet 11, a first side facet 12 and a second side facet 14.

Top facet 11 comprises a front facet edge 16, a rear facet edge 17, a first side facet edge 18, which is also the top edge of first side facet 12, and a second side facet edge 19, which is also the top edge of second side facet 14.

First side facet 12 comprises a front facet edge 21, a rear facet edge 22, a top edge 18, as noted above, and a bottom lip 23.

Second side facet 14 comprises a front facet edge 25, a rear facet edge 26, a top edge 19, as noted above, and a bottom lip 27.

When playing golf, it is often necessary to judge the distance to the hole in order to determine which club to use. Generally, the further the player is away from the hole, the less the loft or lift that is required on the ball. That is, for the same stroke of the club, for greater distances, less lift is required on the ball, the lift being caused by the vertical angle that the club head makes with the ball at the point of impact. Thus, the angle of the club head more nearly approaches the vertical as the distance to the hole becomes greater.

Golf clubs are numbered, based on the vertical angle the club head makes with the ball. Beginning with a No. 1, iron, for example, the club head is almost vertical. As the number increases, the club head vertical angles increase up to a No. 9 iron, whose club head angle gives the ball its highest lift, with the exception of the "pitching wedge" which has an even greater club head vertical angle and is used for special shots.

Thus, the closer the golfer approaches the hole or pin, the higher the numbered club he should use.

The flag staff or "pin" that is used to mark the location of the hole in the golf course greens are all of a standard height, generally 7 feet (84 inches), however, the actual length of shaft above the ground that can be seen by the golfer is 6.5 feet (78 inches) since the bottom of the shaft is positioned in the hole that is 4 inches deep plus an additional 2 inches that engages the bottom of the shaft and holds the flag staff upright. The top of the flag is generally ½ to 1 inch below the top of the shaft, however, for all practical purposes it can be considered at the top of the shaft. For the present distance measuring device, this standard visible height of 6.5 feet (78 inches) will be used as the "known dimension" when comparing the facet edges to the flag staff height.

For example, for the average golfer, a No. 9 iron should be used when the distance to the hole is about 110 yards, a No. 7 iron should be used at about 130 yards, while a No. 5 iron should be used at a distance of 150 yards and a No. 3 iron should be used at about 170 yards.

Figure 2:
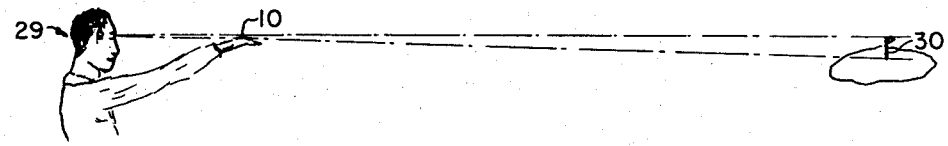
FIG. 2 is a view of the manner in which the distance measuring ring of the present invention is used.

To measure such distances, the golfer or observer 29 holds ring 10 at arms length while wearing it on his finger, as shown in FIG. 2, and sights along any edge 16, 17, 22 or 26, until the length of one of the edges matches the height of flag staff or pin 30.

Figure 3:
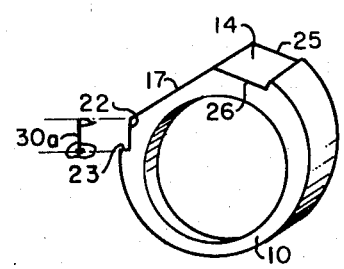
FIG. 3 is a view of the distance measuring ring of the present invention as seen by the observer when matching a facet edge with the flag staff.

For example, referring to FIG. 3, edge 22 of first side facet 12 is shown with the top of flag staff 30 even with edge 18 and the bottom even with lip 23, thus matching the height of flag staff 30 and indicating the use of a 3 club.

The distance for such a club, as noted above, is about 170 yards. With a flag staff 30 height of 6.5 feet (78 inches) and a distance of the ring from the observers eye of 2 feet, the length of edge 22 can be calculated according to the following equation:

$$e/2 = 12h/3d$$

where:
- $e$ = length of facet edge in inches.
- $h$ = height of flag staff in feet.
- $d$ = distance to flag staff in yards.

Thus the length of each edge for the given club size and distance can be calculated and the results of such calculations are shown in Table 1.

TABLE 1

| Club | Distance to Flag Staff Yards | Length of Edge Inches | Facet Edge Number |
|---|---|---|---|
| 3 | 170 | .306 | 22 |
| 5 | 150 | .346 | 26 |
| 7 | 130 | .400 | 17 |
| 9 | 110 | .473 | 16 |

Figure 4:
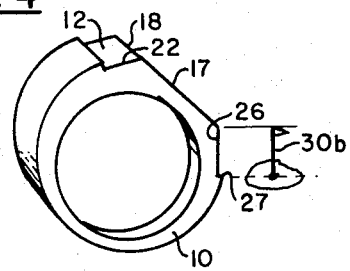
FIG. 4 is another view of the distance measuring ring of the present invention as seen by the observer when matching a facet edge with the flag staff.

In a like manner, with reference to FIG. 4, flag staff 30b is shown with its top even with edge 19 and its bottom even with lip 27, indicating that a No. 5 club should be used.

Figure 5:
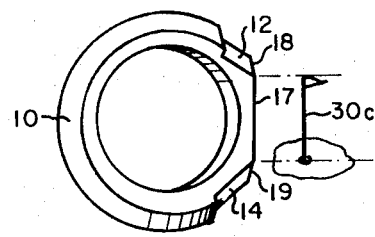
FIG. 5 is still another view of the distance measuring ring of the present invention as seen by the observer when matching a facet edge with the flag staff.

Similarly, with reference to FIG. 5, flag staff 30c is shown with its top edge even with the point of intersection of edges 18 and 22 and its bottom end even with the point of intersection of edges 19 and 26, thus indicating that a No. 7 club should be used.

Similarly, a No. 4 club should be used when a size intermediate between a No. 3 and a No. 5 club is indicated, and a No. 6 club whould be used when a size intermediate between a No. 5 and a No. 7 club is indicated as is further discussed below.

Figure 6:
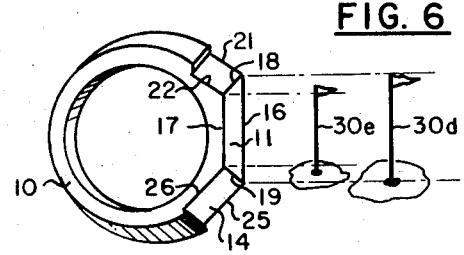
FIG. 6 is a view of the distance measuring device of the present invention as seen by the observer when matching and interpolating a distance using a golf course flag staff.

With reference to FIG. 6, flag staff 30d is shown with its top even with the point of intersection of edges 18 and 21 and its bottom end even with the point of intersection of edges 19 and 25, indicating that a No. 9 club should be used.

Still with reference to FIG. 6, flag staff 30e is shown shorter that edge 16 but longer that edge 17 thus indicating that a club size intermediate between a No. 7 and a No. 9 should be used, e.g., a No. 8 club, the club having a vertical angle intermediate between that of a No. 7 and a No. 9 club.

If desired, additional facet edges could be added to the distance measuring ring described above which could be used for even as well as odd numbered club sizes. For example, Table 2 shows the length of facet edge for even club sizes.

TABLE 2

| Club | Distance to Flag Staff Yards | Length of Edge Inches |
|---|---|---|
| 2 | 180 | .289 |
| 4 | 160 | .325 |
| 6 | 140 | .372 |
| 8 | 120 | .433 |

Of course, for a flag staff height of greater or lesser dimension than the one used in the above example, the length of the facet edge would have to be adjusted accordingly using the above equation with "$h$" equal to the new dimension.

I claim:

1. A distance measuring device comprising a ring adapted to fit on the finger of an observer, a plurality of facets on said ring having edges of different dimensions, the edges of said facets arranged on said ring in a manner permitting comparison of individual edges with said known dimension of said distant object when said ring is worn on a finger of said observer and held at arms length from an eye of said observer.

2. The distance measuring device as claimed in claim 1 wherein said distant object of known dimension is a golf course flag staff.

3. The distance measuring device as claimed in claim 1 wherein
    the edges of said facets are disposed on the top front, top rear, and sides of said ring.

4. The distance measuring device as claimed in claim 3 wherein
    the edges of said plurality of facets are of different dimensions, each dimension adapted for comparison with a golf course flag staff height and calibrated in the size number of golf club for use at the distance where a facet edge matches the height of said flag staff when said ring is held at arms length from the eye of said observer.

5. The distance measuring device as claimed in claim 1 wherein said facets comprise
    a top facet having a front edge and a rear edge,
    a first side facet having a bottom lip and a rear edge, and
    a second side facet having a bottom lip and a rear edge.

6. The distance measuring device as claimed in claim 5 wherein the lengths of said facet edges are adapted for comparison with a golf course flag staff height and calibrated in the size number of a golf club for use at the distance where a facet edge matches the height of said flag staff when said ring is held at arms length from the eye of said observer.

7. The distance measuring device as claimed in claim 5 wherein
    said first side facet top edge is coincident with a side edge of said top facet, and
    said second side facet top edge is coincident with a side edge of said top facet.

* * * * *